United States Patent
Wei et al.

(10) Patent No.: US 8,000,385 B2
(45) Date of Patent: Aug. 16, 2011

(54) MULTIPLE DEVICES COMMUNICATING ON A SINGLE COMMUNICATION CHANNEL WITH A CONSECUTIVELY SEQUENCED SIGNAL

(75) Inventors: Wright Wei, Shenzhen (CN); Xin Ding, Shenzhen (CN); Hardy Fung, Shenzhen (CN); Jason Liu, Shenzhen (CN)

(73) Assignee: Computime, Ltd. (HK)

( * ) Notice: Subject to any disclaimer, the term of this patent is extended or adjusted under 35 U.S.C. 154(b) by 550 days.

(21) Appl. No.: 12/191,679

(22) Filed: Aug. 14, 2008

(65) Prior Publication Data

US 2010/0040132 A1    Feb. 18, 2010

(51) Int. Cl.
*H03K 7/08* (2006.01)
(52) U.S. Cl. ........................................................ 375/238
(58) Field of Classification Search .................. 375/285, 375/295, 238; 370/295, 338, 342, 349, 445
See application file for complete search history.

(56) References Cited

U.S. PATENT DOCUMENTS

| | | | |
|---|---|---|---|
| 6,128,290 A | 10/2000 | Carvey | |
| 6,246,693 B1 * | 6/2001 | Davidson et al. | 370/445 |
| 6,384,651 B1 | 5/2002 | Horigan | |
| 6,950,404 B2 | 9/2005 | Pearl | |
| 7,327,683 B2 * | 2/2008 | Ogier et al. | 370/236 |
| 2006/0052055 A1 | 3/2006 | Rowse | |
| 2006/0115016 A1 | 6/2006 | Chen et al. | |
| 2007/0290810 A1 | 12/2007 | Ovard | |

FOREIGN PATENT DOCUMENTS

| | | |
|---|---|---|
| CN | 1905543 A | 1/2007 |
| CN | 101035129 A | 9/2007 |
| WO | 0079502 A1 | 12/2000 |

OTHER PUBLICATIONS

International Search Report for PCT/CN2009/073224, dated Nov. 19, 2009, pp. 1-3.

* cited by examiner

*Primary Examiner* — Khanh C Tran
(74) *Attorney, Agent, or Firm* — Banner & Witcoff, Ltd.

(57) ABSTRACT

The present invention provides apparatuses, methods, and computer readable media for supporting communications for a plurality of transmitter-receiver pairs on a common frequency spectrum. A transmitting device transmits a consecutively sequenced signal sequentially containing messages to a corresponding receiving device. A duty cycle adjustment circuit determines the duration between adjacent messages so that the consecutively sequenced signal is characterized by a randomized duty cycle. The duty cycle adjustment circuit selects the duration from a sequence that is characterized by an average duration. The duty cycle adjustment circuit obtains the duration from an array by determining an index from a function of a random variable. A receiving device receives a consecutively sequenced signal sequentially containing messages from a transmitting device, where the consecutively sequenced signal is characterized by a randomized duty cycle. A processing circuit detects the messages and initiates an error signal when a predetermined number of consecutive invalid messages are detected.

14 Claims, 8 Drawing Sheets

MULTIPLE DEVICES COMMUNICATING ON A SINGLE COMMUNICATION CHANNEL WITH A CONSECUTIVELY SEQUENCED SIGNAL

BACKGROUND

Control systems are increasingly migrating to wireless channels in order to eliminate tethered wired connections. Control systems may be used for a variety of applications, where different receiving devices are controlled by different controlling device. For example, a controller can control a specific controlled device by transmitting a message in one direction based on a unique serial number. With a wired connection, reconfiguring the placement of the control devices often require changing wiring or cables, which can be time consuming and expensive. A wireless implementation may facilitate reconfiguration. However, with a wireless implementation and with open loop single direction transmission, a plurality of transmitter-receiver pairs may simultaneously operate on a common frequency spectrum, resulting in an undesirable interaction between the different transmitter-receiver pairs and thus impeding proper operation.

Thus, there is a real market need to provide reliable communications for a plurality of transmitter-receiver pairs that operate on a common frequency spectrum, where each pair includes a transmitter communicating with a corresponding receiver in an open loop mode.

SUMMARY

The present invention provides apparatuses, methods, and computer readable media for supporting communications with a plurality of transmitter-receiver pairs on a common frequency spectrum.

With another aspect of the invention, a transmitting device transmits a consecutively sequenced signal sequentially containing messages to a corresponding receiving device. A duty cycle adjustment circuit determines the duration between adjacent messages so that the consecutively sequenced signal is characterized by a randomized duty cycle.

With another aspect of the invention, the duty cycle adjustment circuit selects the duration from a sequence that is characterized by an average duration. The duty cycle adjustment circuit obtains the duration from an array by determining an index to the array from a function of a random variable.

With another aspect of the invention, a receiving device receives a consecutively sequenced signal sequentially containing messages from a transmitting device, where the consecutively sequenced signal is characterized by a randomized duty cycle. A processing circuit detects the messages and initiates an error signal when a predetermined number of consecutive invalid messages are detected. A receiving device may perform an appropriate operation when a predefined message is received.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

Different transmitters send messages to associated receivers with consecutively sequenced signals over a common frequency spectrum. The duration between messages are varied by each transmitter to ameliorate clocks independently drifting for the plurality of transmitters.

Figure 1:
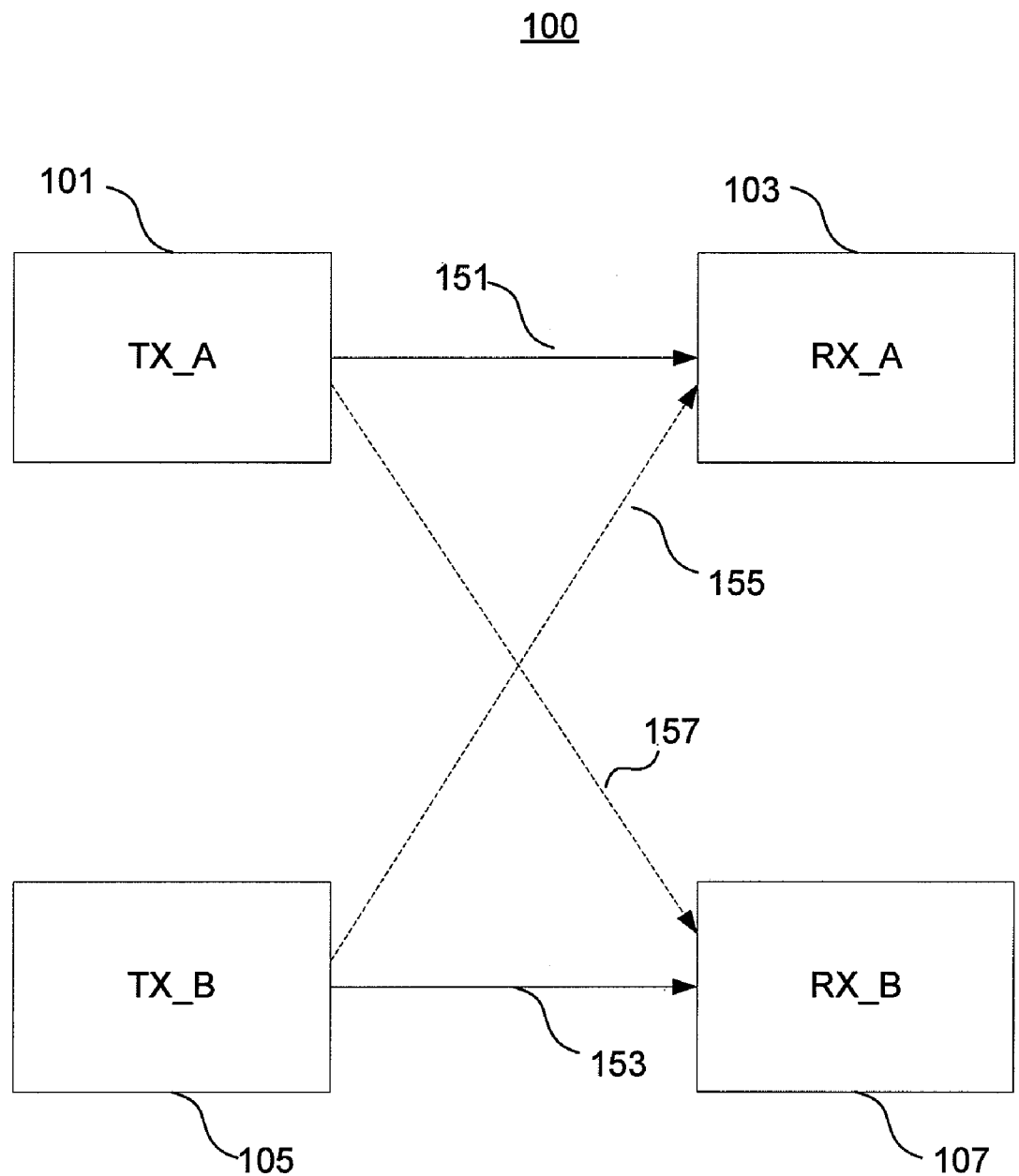
FIG. 1 shows a communication system in which a plurality of devices communicate on a single communications channel in accordance with an embodiment of the invention.

FIG. 1 shows communication system 100 in which a plurality of devices communicate on a single communications channel in accordance with an embodiment of the invention. For example, transmitter 101 transmits a signal to receiver 103 (over communications channel 151) and transmitter 105 transmits a signal to receiver 107 (over communication channel 153) on a common frequency spectrum by transmitting a message with a small duty cycle and by identifying the receiver by a device identification. If the messages are non-overlapping, each receiver is able to detect the intended messages. However, if the messages overlap, receivers 103 and 107 may not be able to detect the intended messages because different messages that are intended for different receiving devices collide. Such a condition is depicted by interference 155 and 157.

Embodiments of the invention support different electromagnetic spectra, including radio frequency, infra-red, and visible light.

Figure 2:
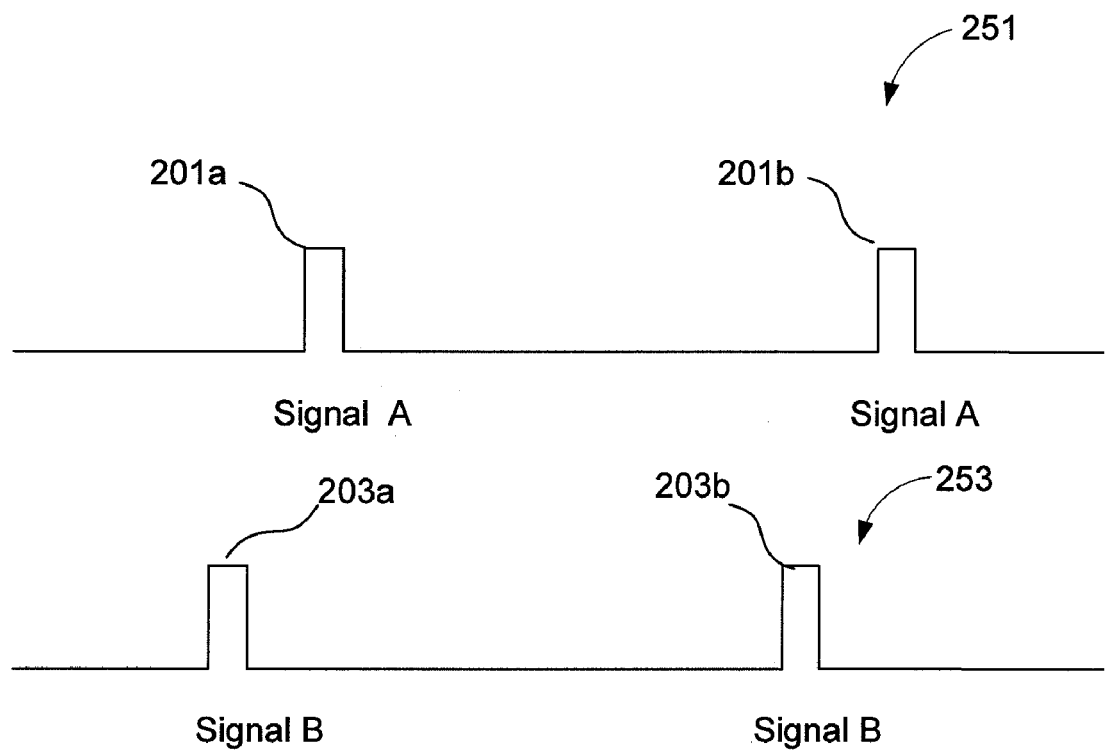
FIG. 2 shows a plurality of consecutively sequenced signals that are transmitted over a common frequency spectrum in accordance with an embodiment of the invention.

FIG. 2 shows a plurality of consecutively sequenced signals 251 and 253 that are transmitted over a common frequency spectrum in accordance with an embodiment of the invention. Messages 201a and 201b are sent sequentially over consecutively sequenced signal 251, while messages 203a and 203b are sent sequentially over consecutively sequenced signal 253. The interval between messages has a varying value with an average interval as disclosed herein. For example, the average interval may be 500 msec with a message duration spanning 5 msec (corresponding to a 1% duty cycle).

With an embodiment of the invention, receivers 103 and 107 operate with a consecutively sequenced received signal. A receiver may not be able properly operate if a message cannot be received within a number of repeated intervals. Due to regulatory requirements, RF signal may be transmitted for a predefined period of time, e.g., $1/100$ (1%) duty cycle, where the duty cycle may be defined as the duration of a message divided by the duration between adjacent messages.

If more than one pair of transmitter-receiver operates on the same channel in an open loop mode, the received signal may drop after running some time because of frequency drift between devices (clock drift). This phenomenon may be caused by a fixed duty cycle used by all transmitters. If another transmitter operates with the same fixed duty cycle and transmits at a different time (with no clock drift), theoretically, the two transmitters can theoretically operate properly, where messages never collide with each other.

However, with frequency drift of the transmitter clocks, the timing of two transmitting devices is typically not exactly the same due to component tolerance. If clock generation of the transmitters is not exactly the same with a fixed duty cycle (when the clocks of different transmitting devices drift with respect to each other), transmission from different transmitters can collide with each other at some point of time, where messages (e.g., 201b and 203b) overlap). As an example assume that the clock difference of device A and B is 10 ppm. If signal 251 and signal 253 start with 500 ms time separation, the time for signal 251 to collide with signal B is 0.5 sec/10 ppm=0.5/0.00001=50,000 sec=13.88 hours. Assuming a duty cycle of 1%, signal 251 and signal 253 keep continual overlap 1% of the time (500 seconds corresponding to 1000 consecutive messages being invalid). This example illustrates the possibility of a receiver missing a large number of consecutive messages from the corresponding transmitter without an alternative approach. As disclosed herein, transmitters (e.g., transmitter 101) independently vary the duration between adjacent messages (e.g., messages 201 and 201b).

Figure 3:
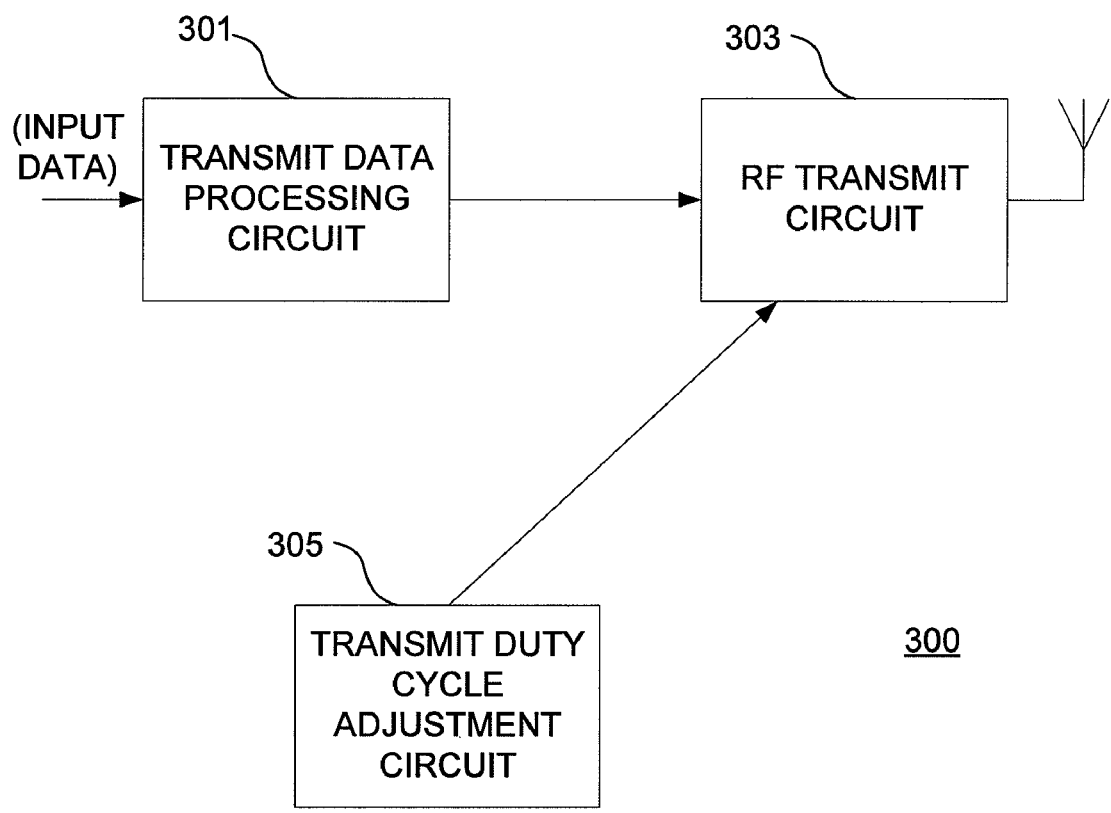
FIG. 3 shows a block diagram of a transmit device in accordance with an embodiment of the invention.

FIG. 3 shows a block diagram of transmitting device 300 in accordance with an embodiment of the invention. Transmit device 300 obtains information to be transmitted in a message to the associated receiver through transmitting data processing circuit 301. The data is included in a message conveyed on a consecutively sequenced signal that is transmitted by transmit circuit 303. The duration between messages is varied by duty cycle adjustment circuit 305. Circuit 305 may be implemented in numerous manners, including a processor-based circuit, computer-readable medium (storing computer-readable instructions for a software algorithm), an integrated circuit, or with discrete components as appreciated by one skilled in the art.

Duty cycle adjustment circuit 305 introduces random duty cycle for transmitting device 300. The duty cycle may also be limited within a valid range. The duty cycle is essentially randomized by utilizing a sequence and by indexing the sequence based on a random variable as disclosed herein. Generating the random pattern is unique by utilizing the serial number (SerialNo) of the transmitting device and one random bit as random sign, where RanSign is assigned either plus (+) or minus (−). Consequently, the sequence of duration values varies with the value of the device's serial numbers. The generalized formula is:

$$S(0)=f_1(SerialNo) \quad (EQ. 1)$$

where $f_1$ is a function of SerialNo with limited length.

$$S(n)=f_3\{f_2(SerialNo)*RanSign, S(n-1)\} \quad (EQ. 2)$$

where $f_2$ and $f_3$ are functions and where n=1, 2, 3.

$$Duration=f_4(S(n)) \quad (EQ. 3)$$

where $f_4$ is a another independent function of S(n).

The following example is an exemplary algorithm utilizing $f_1, f_2, f_3,$ and $f_4$. For an eight-bit SerialNo, S(0) can be determined from EQ. 1 to form the initial S(0).

$$S(0)=(SerialNo/16)XOR(SerialNo \, MOD \, 16) \quad (EQ. 4)$$

where $f_1$ corresponds to XOR(SerialNo/16, SerialNo MOD 16).

Letting $$DUR\_CONSTANT=f_2(SerialNo)=(SerialNo \, MOD \, 8)+1 \quad (EQ. 5)$$

From EQ. 2, one determines S(n) for the $n^{th}$ repetitive step, corresponding to the $n^{th}$ transmission to the receiving device:

$$S(n)=(DUR\_CONSTANT *RanSign+S(n-1)) \, MOD \, 16 \quad (EQ. 6)$$

From the results of EQ. 6, one can determine the duration between the $n-1^{th}$ and the $n^{th}$ transmission from the transmitting device to the receiving device. The possible values of the duration are specified in a 16-element array, where the sequence (array) specifies function $f_4$:

$$DurationArray[16]=\{232, 228, 224, 220, 216, 212, 208, 204, 200, 196, 192, 188, 184, 180, 176, 172\} \, //The \, number \, represent \, the \, time \, in \, ms. \quad (EQ. 7)$$

Values of elements in DurationArray may be limited by regulatory requirements and by a desired range of duty cycles. For example, if RF regulatory requirements limit a signal duration of 1.6 msec, the minimum value of an element is limited to 160 msec with a duty cycle of 1%.

$$SearchIndex=S(n) \quad (EQ. 8)$$

$$Duration=DurationArray[SearchIndex] \quad (EQ. 9)$$

where $f_4$ corresponds to DurationArray[SearchIndex(S(n))].

The following numeric example utilizes the above equations.

Let: SerialNo=0x83;

S(0)=0x08 XOR 0x03=0x0B=11 where S(0) is a "seed index" of this device.

DUR_CONSTANT=(0x83 MOD 8)+1=4 where DUR_CONSTANT is the "variation index" of this device.

Assume a random sign for each S(n):

(−1) for S(1), then: $S(1)=(4*(-1)+S(0))MOD16=-4+11=7$;

(+1) for S(2), then: $S(2)=(4*(+1)+S(1))MOD16=4+7=11$;

(+1) for S(3), then: $S(3=(4*(+1)+S(2))MOD16=4+11=15$;

(+1) for S(4), then: $S(4)=(4*(+1)+S(3))MOD16=(4+15)MOD16=3$;

(−1) for S(5), then: $S(5)=(4*(-1)+S(4))MOD16=(-4+3)MOD16=15$;

(−1) for S(6), then: $S(6)=(4*(-1)+S(5))MOD16=-4+15=11$;

Consequently, this device will perform a sequence of: S[n]={11, 7, 11, 15, 3, 15, 11 . . . } where n=0, 1, 2, 3, 4, 5, 6 . . .

The corresponding duration sequence is: {188, 204, 188, 172, 220, 172, 188 . . . } (msec)

Duty cycle adjustment circuit 305 obtains new value of the duration using the above algorithm to ameliorate overlap for a plurality of messages with a consecutively sequenced signal.

Figure 4:
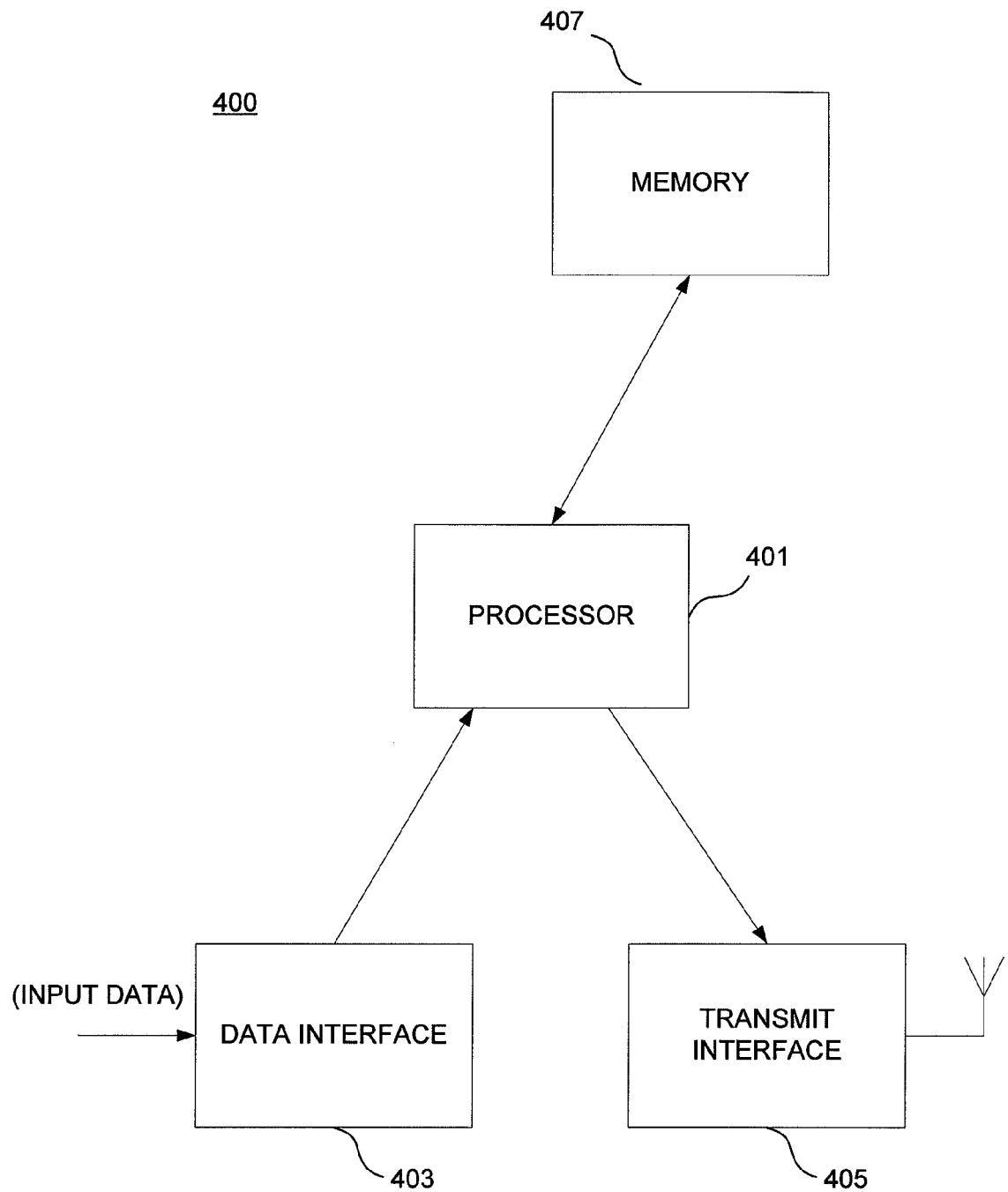
FIG. 4 shows a processing system that supports the block diagram shown in FIG. 3 in accordance with an embodiment of the invention.

FIG. 4 shows processing system 400 that supports the block diagram shown in FIG. 3 in accordance with an embodiment of the invention. Processor 401 processes input data obtained through data interface 403 for inclusion in a message conveyed on a consecutively sequenced signal transmitted by transmit interface 405. With an embodiment of the invention, processor 401 utilizes EQs. 1-4 to determine the duration between messages. With embodiments of the invention, processor 401 fetches computer-executable instructions from memory 407 in order to determine results based on EQs. 1-4. Processor 401 sends messages to an associated receiving device through transmit interface 405 based on the determined duration.

Figure 5:
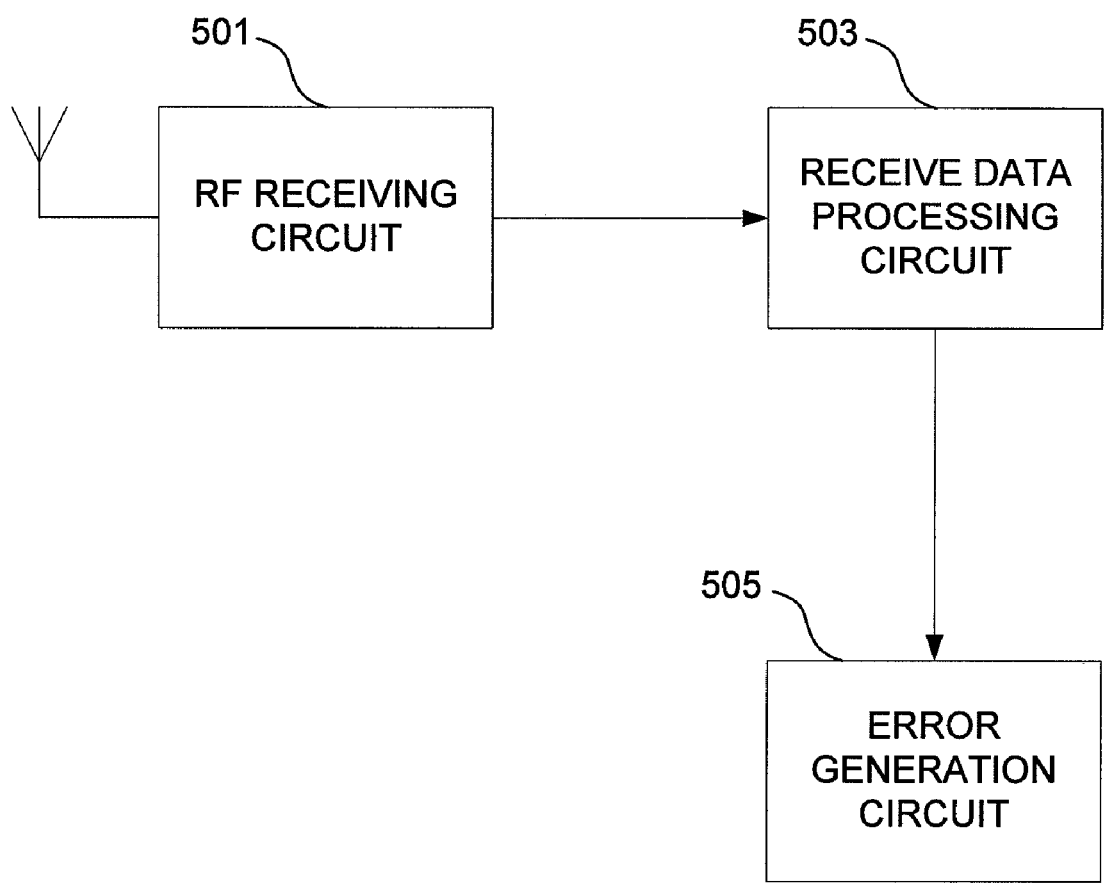
FIG. 5 shows a block diagram of a receive device in accordance with an embodiment of the invention.

FIG. 5 shows block diagram 500 of a receiving device in accordance with an embodiment of the invention. A consecutively sequenced RF signal (e.g., signal 251 as shown in FIG. 2) is received by the receiving device through RF receiving circuit 501. Receive data processing circuit 503 processes the messages to determine if the messages are valid. For example, a message may contain the identification number of the receiving device and a valid checksum. When messages from different transmitting devices overlap (e.g., resulting from clock drift), received data is typically corrupted and a message is typically deemed as being invalid by the intended receiving device.

By using this approach, the duration between each signal transmission typically varies in accordance with the duration array. By introducing a mechanism of a predetermined time for waiting that is sufficiently long enough to cover a predetermined number of errors, e.g., five consecutive messages, the receiver is guaranteed to receive a correct signal. For example, if the average duration is 200 ms, the receiver will only signal an error if there is no information received in 1000 ms (1 sec). The receiving device may perform an appropriate operation when a predefined message is received.

If circuit 503 determines that a predetermined number of messages are invalid, circuit 505 initiates an error routine through error generation circuit 505. For example, circuit 505 can activate a visual indicator to alert a user when an error has occurred.

Figure 6:
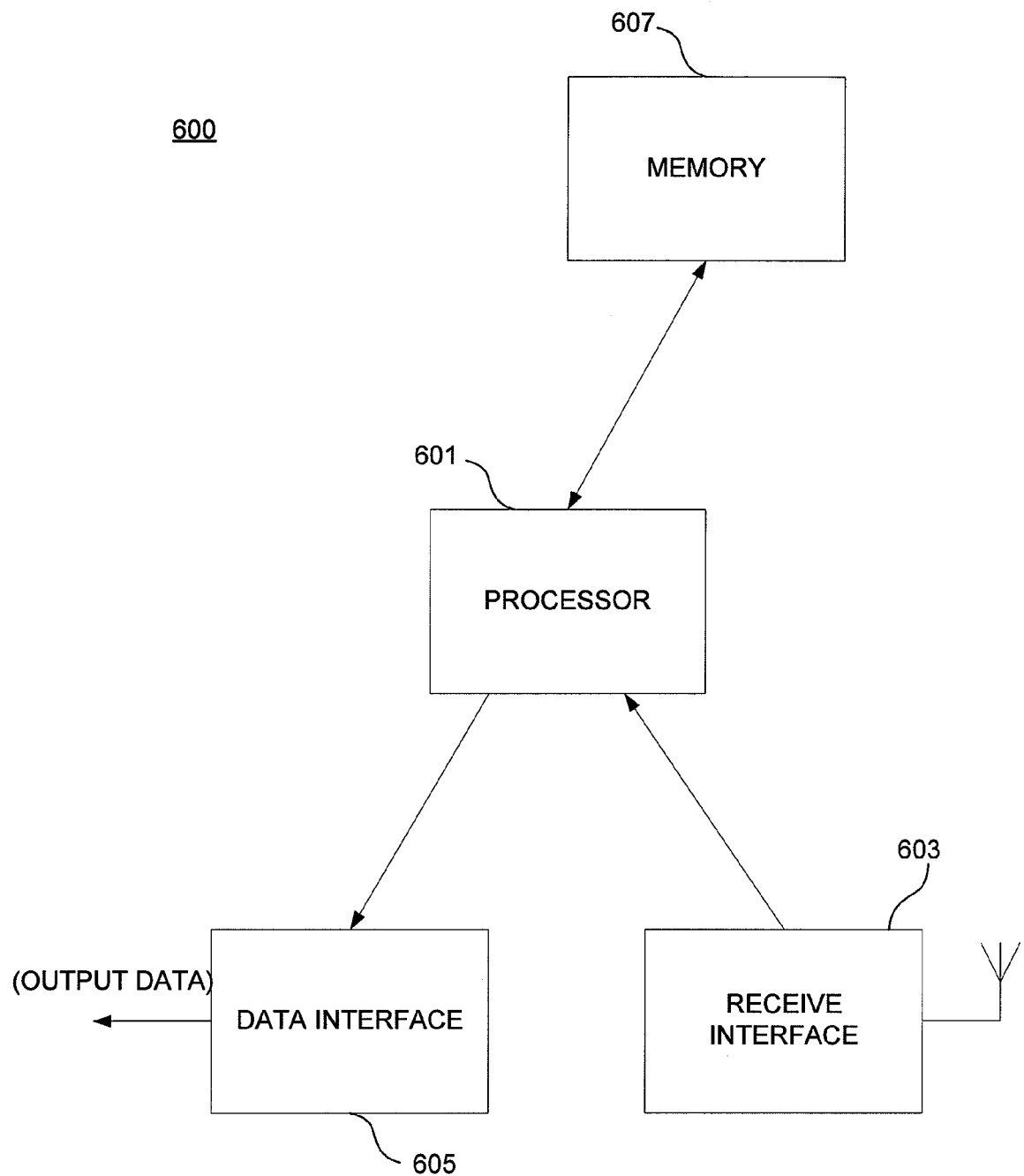
FIG. 6 shows a processing system that supports the block diagram shown in FIG. 5 in accordance with an embodiment of the invention.
Figure 8:
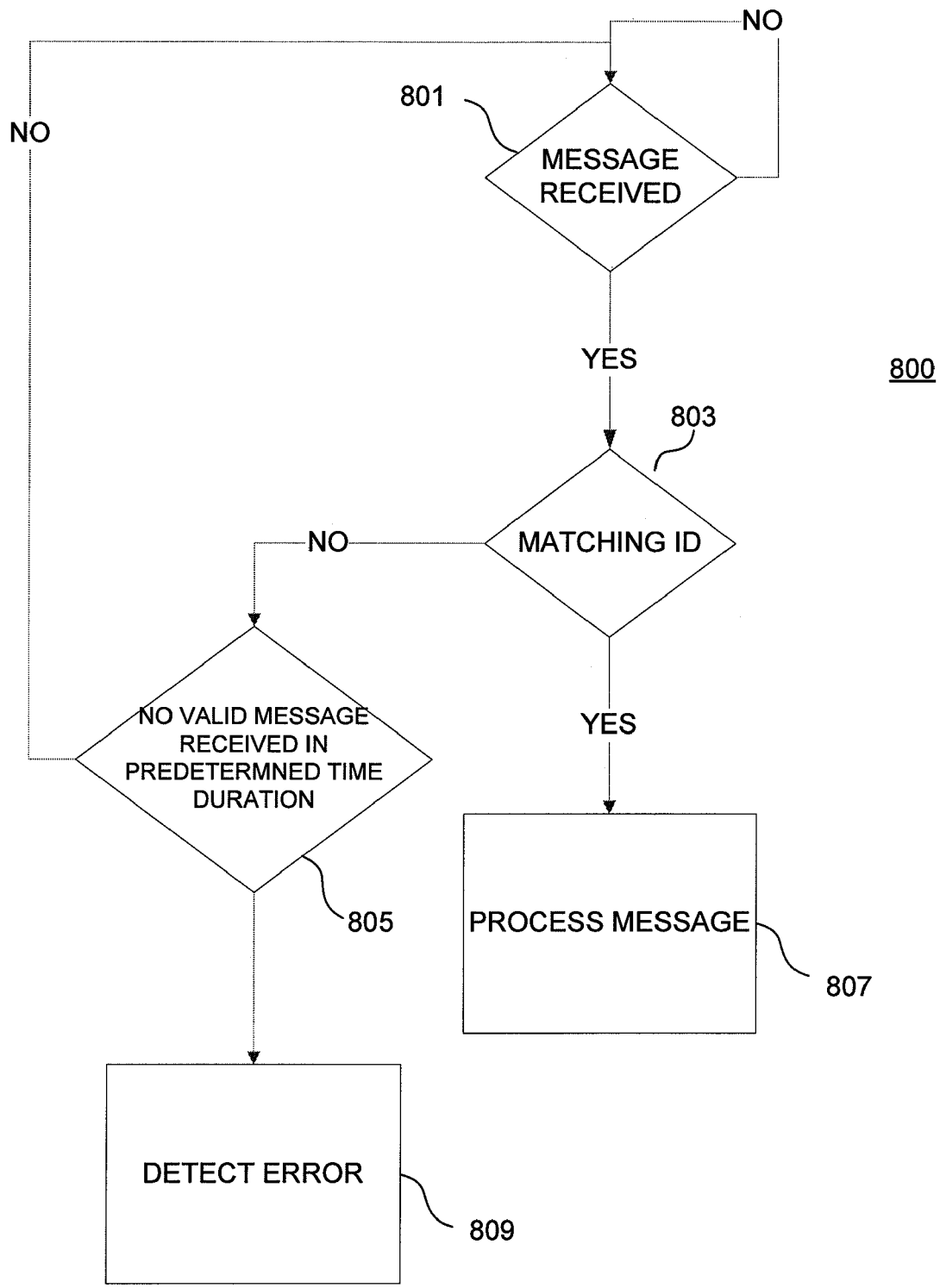
FIG. 8 shows a flow diagram that is performed by the processing system as shown in FIG. 6 in accordance with an embodiment of the invention.

FIG. 6 shows processing system 600 that supports the block diagram shown in FIG. 5 in accordance with an embodiment of the invention. Processor 501 processes received data obtained through receive interface 603 to determine if a valid message is received on the consecutively sequenced RF signal. For example, processor 601 may verify the device identification corresponding to the receiving device. Data from a valid message may be provided to an associated apparatus through data interface 605. With embodiments of the invention, processor 601 fetches computer-executable instructions from memory 607 to perform process 800 as shown in FIG. 8.

Figure 7:
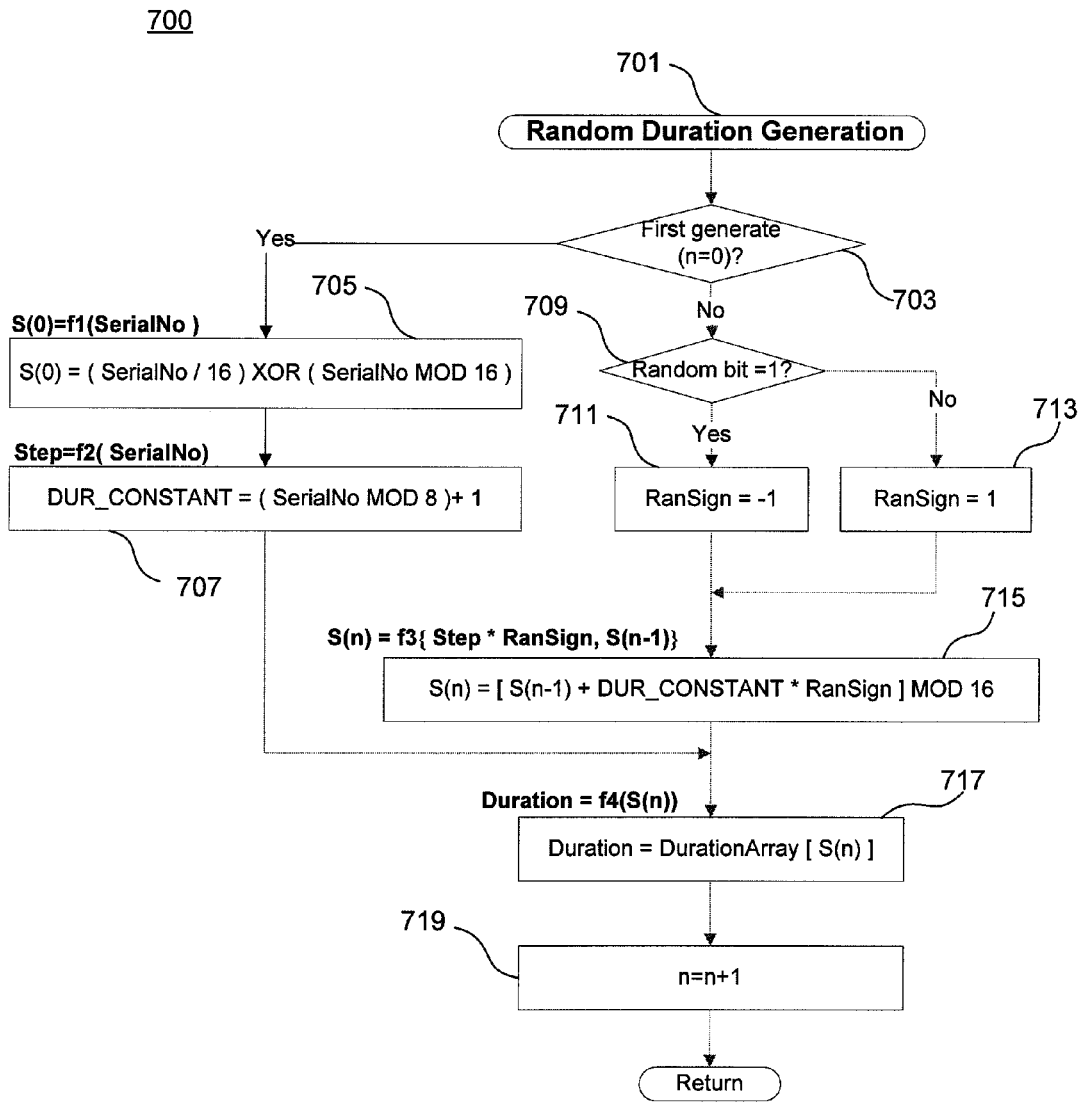
FIG. 7 shows a flow diagram that is performed by the processing system as shown in FIG. 4 in accordance with an embodiment of the invention.

FIG. 7 shows flow diagram 700 that is performed by processing system 400 as shown in FIG. 4 in accordance with an embodiment of the invention. In step 701, processor 401 generates a random number. With embodiments of the invention, only one bit is required since the random number is used to determine an algebraic sign in steps 711, 713, and 715. If step 703 determines that process 700 is executing the initial iteration (corresponding to EQ. 1 or EQ. 4), then processor 401 determines S(0) in step 705 (corresponding to EQ. 4) and the duration constant (DUR_CONSTANT) in step 707 (corresponding to EQ. 5).

After the initial iteration of process 700 has been executed, steps 709, 711, and 713 determine the random bit from the random number generated in step 701. Step 715 (corresponding to EQ. 6) determines S(n) when n=1, 2, 3, . . . in order to access an element in DurationArray in step 717 (corresponding to EQ. 9). Step 719 then increments the number of the next iteration, and process 700 is repeated to determine the duration between the next pair of adjacent messages for the consecutively sequenced signal.

With an embodiment of the invention, the determination of random signs (corresponding to steps 709, 711, and 713) may be performed once every predetermined number of iterations of process 700 rather than for each iteration.

FIG. 8 shows flow diagram 800 that is performed by processing system 600 as shown in FIG. 6 in accordance with an embodiment of the invention. When a message (e.g., message 201a as shown in FIG. 2) is received over a consecutively sequenced signal (e.g., consecutively sequenced signal 251) in step 801, the receiving device determines whether the device identification matches the corresponding transmitter-receiver pair in step 803. If device identification does not match, step 805 determines if the number of consecutive message are deemed as being invalid. If so, an error is detected by the receiving device. In such a case, the receiving device may abort an operation or may activate an alarm. Otherwise, the receiving device processes the received message in step 807. In such a case, the receiving device may perform an operation corresponding to the received message.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A transmitting device comprising:
   a transmitting circuit configured to send a consecutively sequenced signal sequentially containing a plurality of messages to a receiving device; and
   a duty cycle adjustment circuit configured to:
   determine a determined duration between one of the plurality of messages and an adjacent message;
   select the determined duration from a sequence characterized by an average duration;
   obtain the determined duration from the sequence by determining an index to the sequence; and
   instruct the transmitting circuit to send said one message based on the determined duration, wherein the consecutively sequenced signal is characterized by an essentially randomized duty cycle.

2. The transmitting device of claim 1, wherein the duty cycle adjustment circuit determines the index from a function of a random variable.

3. The transmitting device of claim 1, wherein the duty cycle adjustment circuit determines an initial duration from a function of a serial number of the transmitting device.

4. The transmitting device of claim 1, wherein the duty cycle adjustment circuit determines the determined duration from a function of a previous duration.

5. A receiving device comprising:
   a receiving circuit configured to receive a consecutively sequenced signal sequentially containing a plurality of messages from a transmitting device, wherein the consecutively sequenced signal is characterized by an essentially randomized duty cycle; and
   a processing circuit configured to process the plurality of messages and to initiate an error signal when a predetermined number of consecutive invalid messages are detected.

6. A method comprising:
- determining a determined duration between one of a plurality of messages and an adjacent message, wherein the determined duration has an essentially randomized characteristic;
- transmitting a consecutively sequenced signal containing the plurality of messages to a receiving device based on the determined duration;
- selecting the determined duration from a sequence characterized by an average duration; and
- obtaining the determined duration from the sequence by determining an index to the sequence.

7. The method of claim 6, further comprising:
- determining the index from a function of a random variable.

8. The method of claim 7, further comprising:
- utilizing the random variable as an algebraic sign in a relationship relating the determined duration with a previous duration.

9. The method of claim 6, further comprising:
- determining an initial duration from a function of a serial number of the transmitting device.

10. The method of claim 6, further comprising:
- determining the determined duration from a function of a previous duration.

11. A non-transitory computer-readable medium having computer-executable instructions that when executed perform the steps of
- determining a determined duration between one of a plurality of messages and an adjacent message, wherein the determined duration has an essentially randomized characteristic;
- transmitting a consecutively sequenced signal containing the plurality of messages to a receiving device based on the determined duration;
- selecting the determined duration from a sequence characterized by an average duration; and
- obtaining the determined duration from the sequence by determining an index to the sequence.

12. The non-transitory computer-readable medium of claim 11, further including computer-executable instructions that when executed perform the step of:
- determining the index from a function of a random variable.

13. The non-transitory computer-readable medium of claim 11, further including computer-executable instructions that when executed perform the step of:
- determining an initial duration from a function of a serial number of the transmitting device.

14. The non-transitory computer-readable medium of claim 11, further including computer-executable instructions that when executed perform the step of:
- determining the determined duration from a function of a previous duration.

* * * * *